(12) United States Patent
McCullick et al.

(10) Patent No.: US 7,918,645 B2
(45) Date of Patent: Apr. 5, 2011

(54) TORQUE CONVERTER WITH BRAZED TURBINE

(75) Inventors: Donald McCullick, Doylestown, OH (US); Christopher Sidor, Litchfield, OH (US); Joachim Hoffmann, Wooster, OH (US); Chad Keets, Jeromesville, OH (US); Patanjali Peri, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 919 days.

(21) Appl. No.: 11/810,565

(22) Filed: Jun. 6, 2007

(65) Prior Publication Data

US 2008/0044285 A1    Feb. 21, 2008

Related U.S. Application Data

(60) Provisional application No. 60/812,021, filed on Jun. 8, 2006.

(51) Int. Cl.
*F01D 5/22* (2006.01)

(52) U.S. Cl. ......... 416/1; 416/175; 416/180; 416/197 C; 416/213 R (58) Field of Classification Search .............. 416/1, 175, 416/180, 197 C, 213 R; 29/889
See application file for complete search history.

(56) References Cited

U.S. PATENT DOCUMENTS

| | | | | |
|---|---|---|---|---|
| 3,873,237 A | * | 3/1975 | Tokunaga | 416/180 |
| 4,584,835 A | * | 4/1986 | Nishi | 60/330 |
| 4,868,365 A | * | 9/1989 | Farone et al. | 219/121.64 |
| 5,113,654 A | | 5/1992 | Sahashi | |
| 5,282,362 A | * | 2/1994 | Renneker et al. | 60/345 |
| 5,587,092 A | * | 12/1996 | Sullivan et al. | 219/113 |
| 5,813,227 A | | 9/1998 | Dehrmann et al. | |
| 6,024,538 A | * | 2/2000 | Tanishiki et al. | 416/197 C |
| 6,226,985 B1 | | 5/2001 | Sasse et al. | |
| 6,282,785 B1 | * | 9/2001 | Kolodziej et al. | 29/889.5 |
| 2004/0107698 A1 | | 6/2004 | Schleicher et al. | |
| 2005/0074334 A1 | | 4/2005 | Schultz | |
| 2005/0103005 A1 | | 5/2005 | Turner | |

FOREIGN PATENT DOCUMENTS

| | | |
|---|---|---|
| DE | 10257349 | 6/2004 |
| DE | 102004006027 | 9/2004 |
| DE | 102004055295 | 6/2005 |

* cited by examiner

*Primary Examiner* — Igor Kershteyn
(74) *Attorney, Agent, or Firm* — Simpson & Simpson, PLLC (57) ABSTRACT

The invention broadly comprises a torque converter including: a core ring; a turbine blade connected to the ring and having a perimeter with a segment facing an outer surface of the ring and disposed proximate the outer surface; and joining material fixedly connecting less than the entirety of the segment to the outer surface. The segment is fixedly connected to reduce resonance in the turbine. In some aspects, the ring includes an inner surface oppositely disposed from the outer surface and an open path between the surfaces. The present invention broadly comprises a notched turbine blade and a core ring with a discontinuity in an outer surface arranged to block capillary action for flowable joining material disposed in an interface between a turbine blade installed on the ring and the outer surface. The invention also broadly comprises a method for controlling resonance of a turbine in a torque converter.

17 Claims, 13 Drawing Sheets

PRIOR ART

Fig.1

PRIOR ART

Fig.2

PRIOR ART

Fig. 3

PRIOR ART

Fig.4

PRIOR ART

TORQUE CONVERTER WITH BRAZED TURBINE

CROSS-REFERENCE TO RELATED APPLICATIONS

This application claims the benefit under 35 U.S.C. §119(e) of U.S. Provisional Application No. 60/812,021, filed Jun. 8, 2006.

FIELD OF THE INVENTION

The invention relates generally to a turbine for a torque converter, and, more particularly, to a turbine with blades partially brazed to a core ring for the turbine to reduce noise caused by the combination of mechanical and fluid dynamic properties of the turbine sub-assembly.

BACKGROUND OF THE INVENTION

Figure 1:
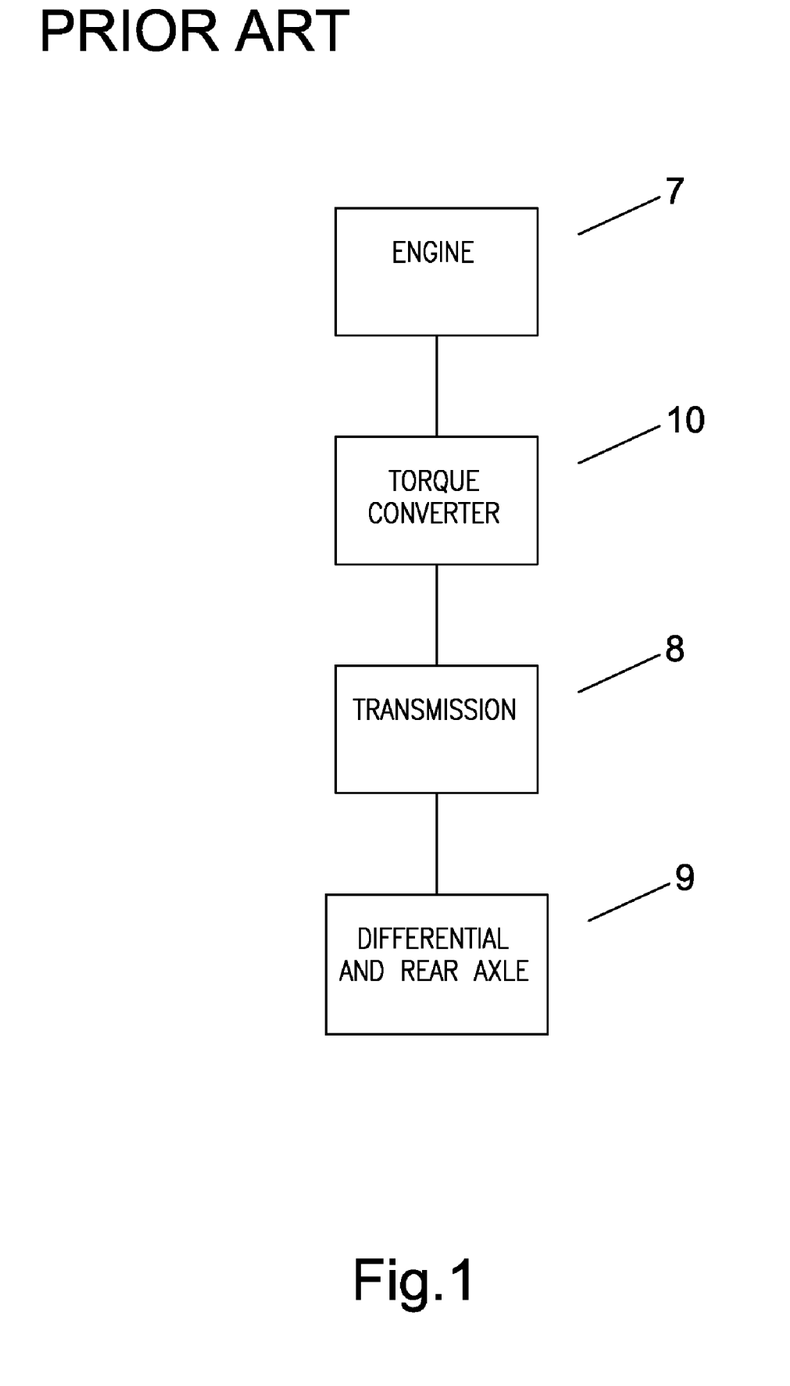
FIG. 1 is a general block diagram illustration of power flow in a motor vehicle, intended to help explain the relationship and function of a torque converter in the drive train thereof.
Figure 2:
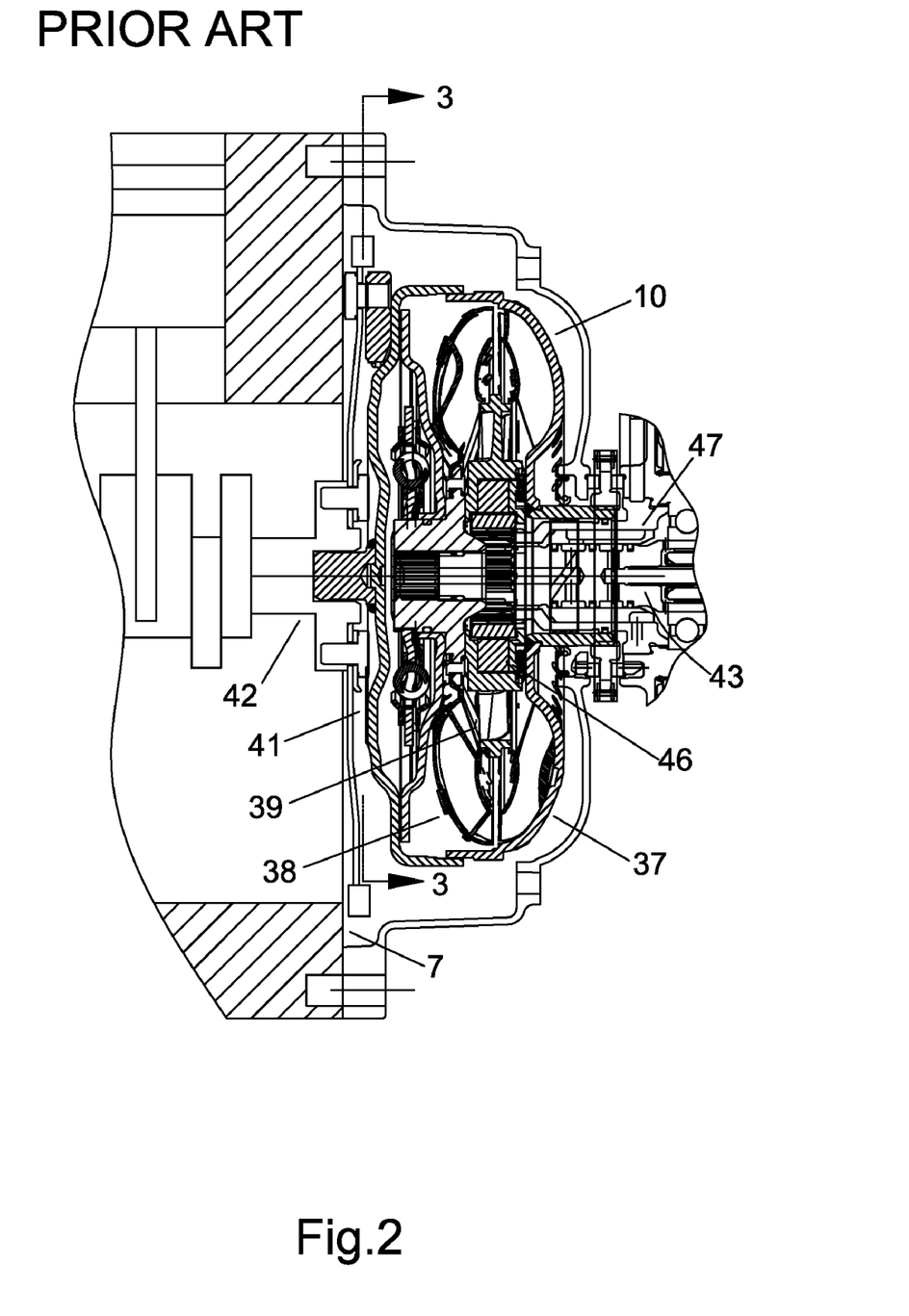
FIG. 2 is a cross-sectional view of a prior art torque converter, shown secured to an engine of a motor vehicle.
Figure 3:
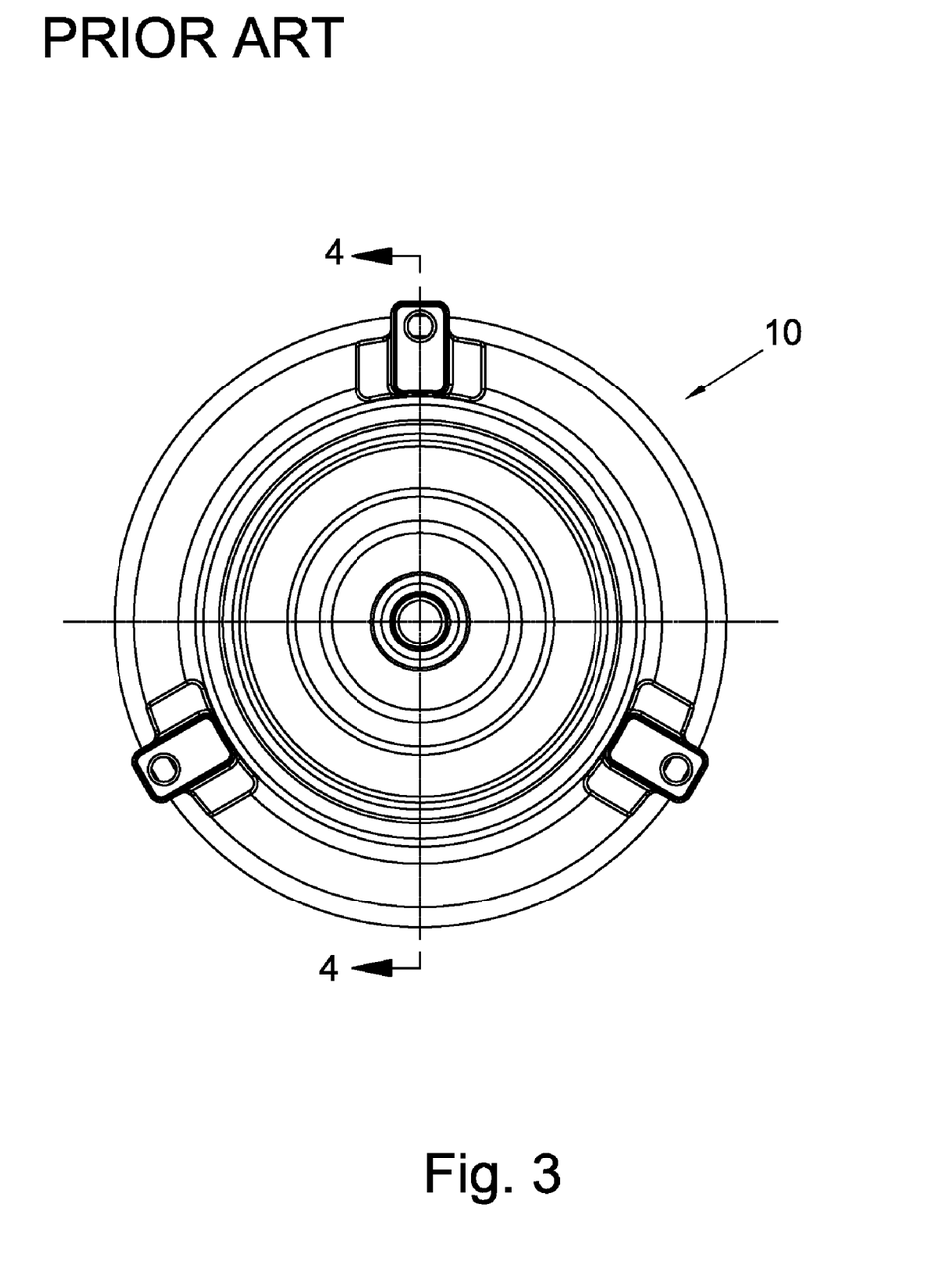
FIG. 3 is a left view of the torque converter shown in FIG. 2, taken generally along line 3-3 in FIG. 2.
Figure 4:
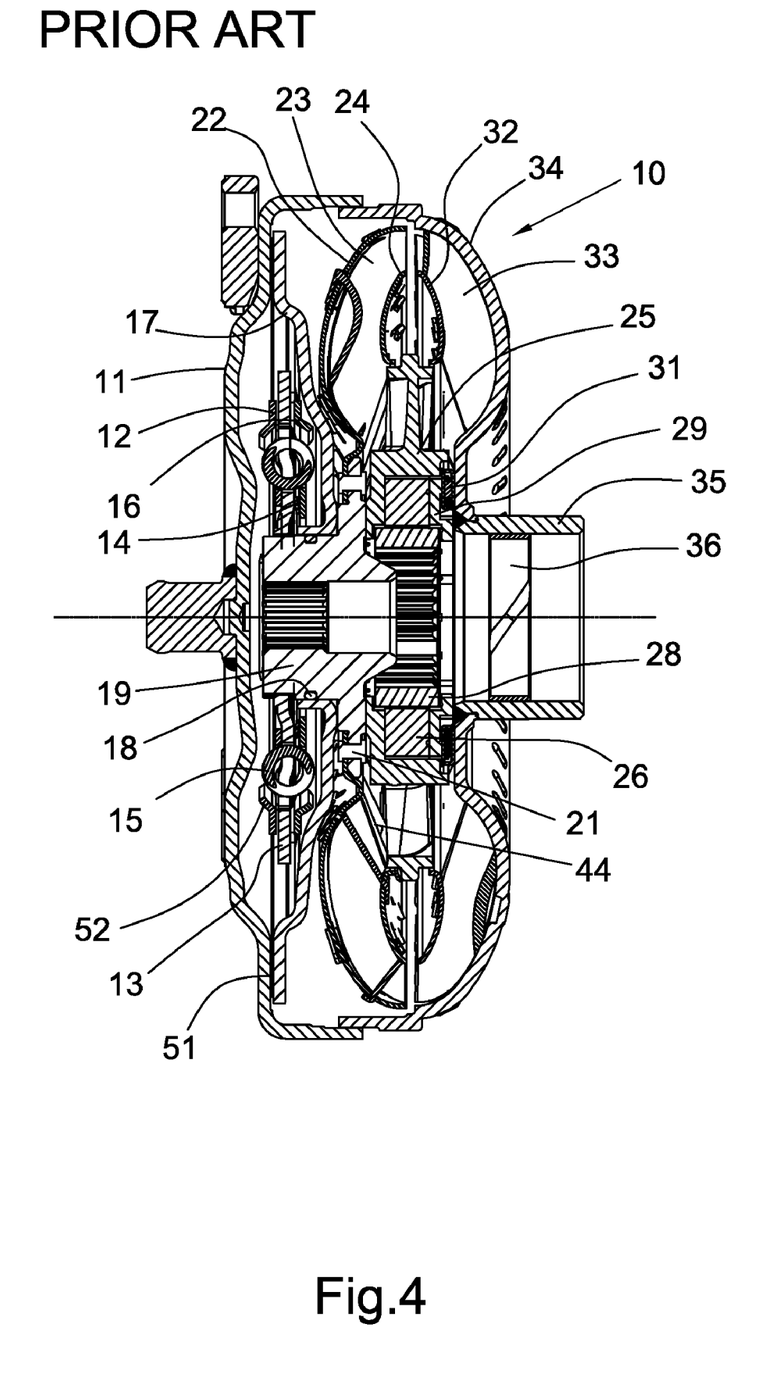
FIG. 4 is a cross-sectional view of the torque converter shown in FIGS. 2 and 3, taken generally along line 4-4 in FIG. 3.
Figure 5:
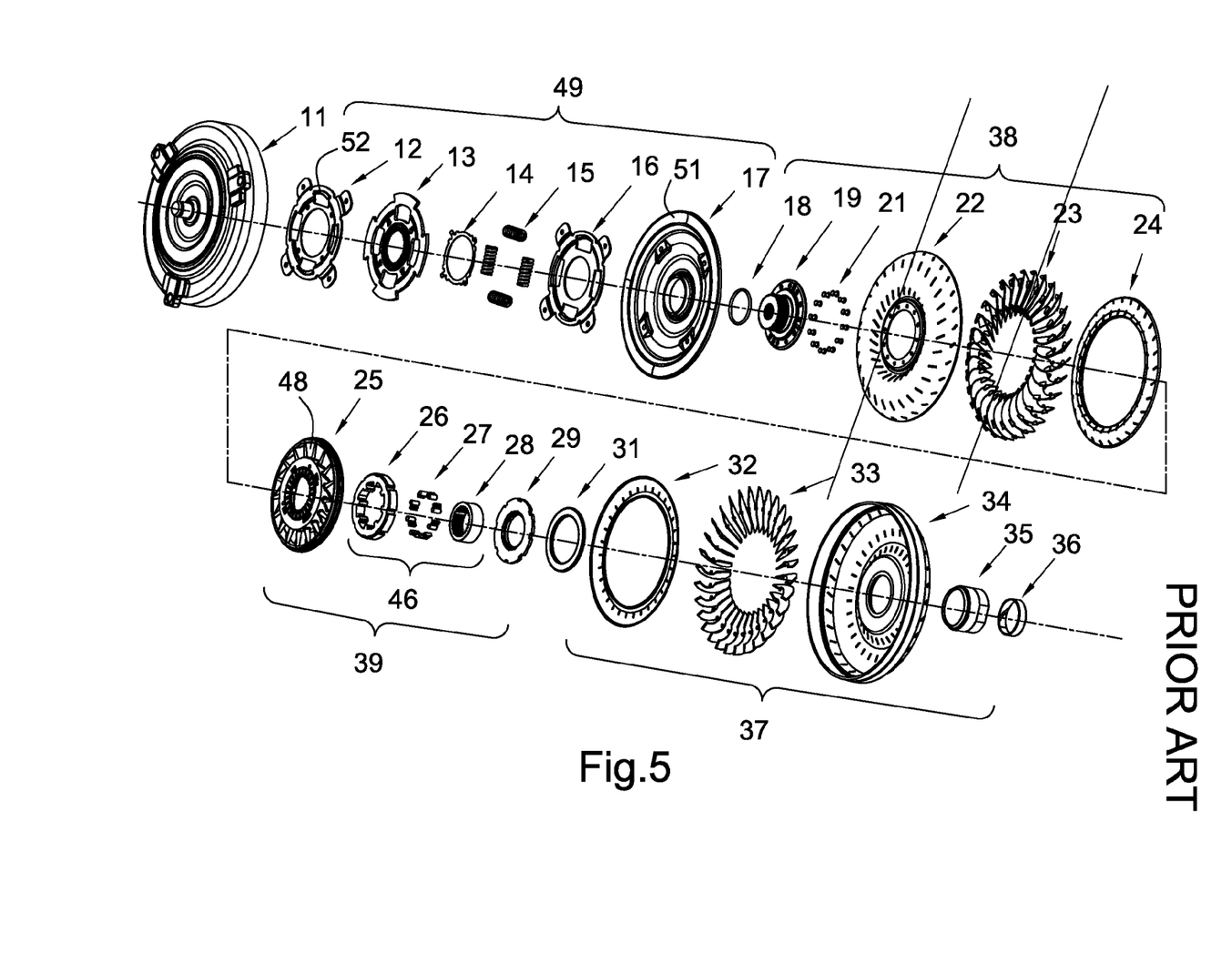
FIG. 5 is a first exploded view of the torque converter shown in FIG. 2, as shown from the perspective of one viewing the exploded torque converter from the left.
Figure 6:
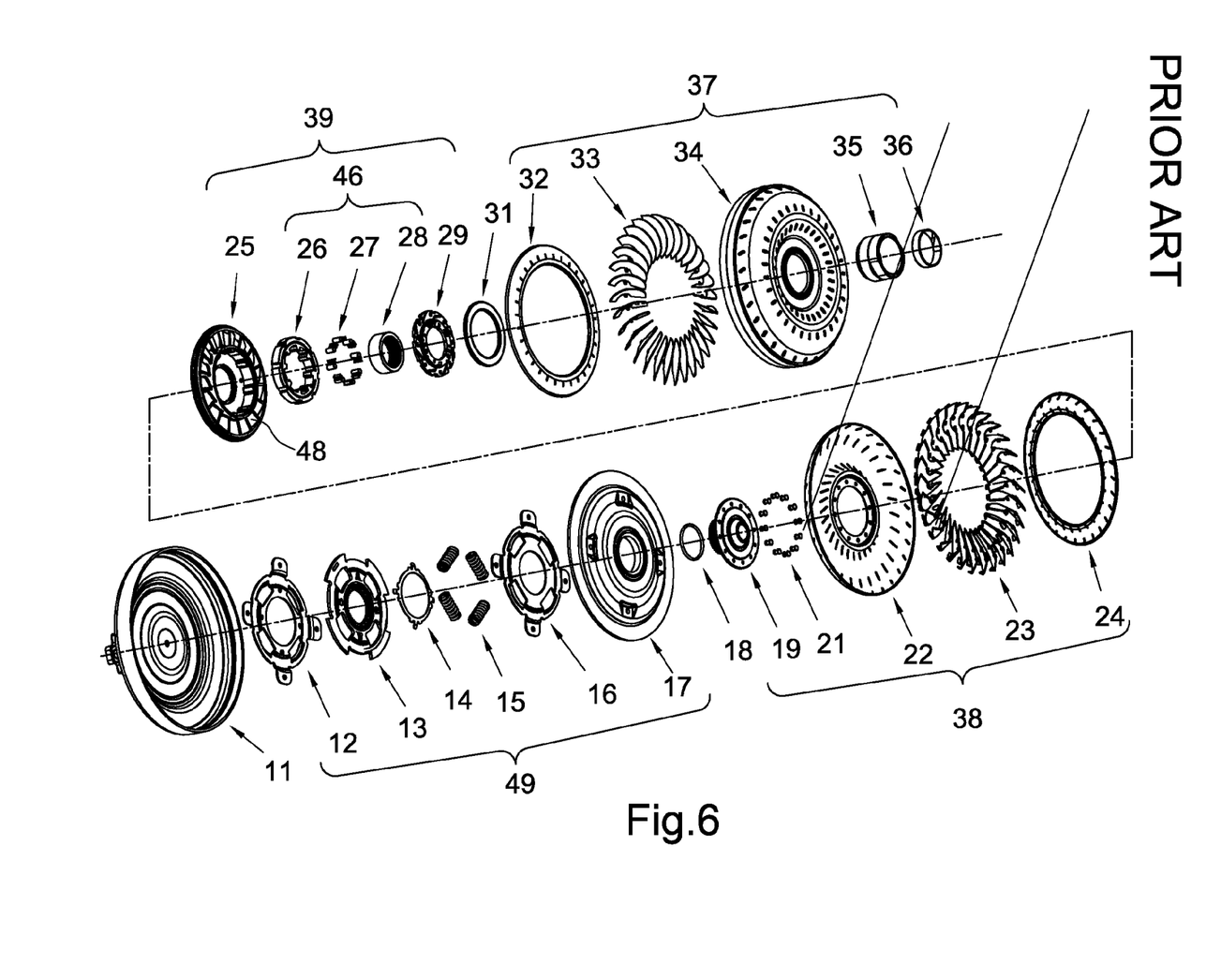
FIG. 6 is a second exploded view of the torque converter shown in FIG. 2, as shown from the perspective of one viewing the exploded torque converter from the right.

It is well known that a torque converter is used to transmit torque from an engine to a transmission of a motor vehicle. FIG. 1 illustrates a general block diagram showing the relationship of the engine 7, torque converter 10, transmission 8, and differential/axle assembly 9 in a typical vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to. transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At high speed ratios, the torque converter is less efficient. The torque ratio of the torque converter gradually reduces from a high of about 1.8 to 2.2, to a torque ratio of about 1 as the turbine rotational speed approaches the pump rotational speed. Torque ratio of 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Maximum torque converter efficiency is limited to 92-93% based on losses in the fluid. Therefore torque converter clutch 49 is employed to mechanically connect the torque converter input to the output, improving efficiency to near 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

Torque converter turbines are generally formed with blades disposed between a core ring and a turbine shell. The blades direct fluid from the inlet of the turbine, which is proximate the outer circumference of turbine, to the outlet of the turbine, which is proximate the inner circumference of the turbine. Blades are typically attached to the core ring with tabs extending from the blade that bent after they are inserted into slots in the core ring. A channel or gap is present at the interface between the blade and the surface of the core ring. Durability and performance of the turbine can be enhanced by applying a joining material along the interface. The joining material can be various materials, but typically, due to the relatively narrow spaces between the blades and the surfaces of the shell and core ring, materials capable of flow through capillary action are used. Typically, the joining material of choice is brazing material such as braze paste, but other alternatives can be used. The application of joining material increases the rigidity of the torque converter turbine by bonding the edges of the blades that face the core ring to surfaces of the core ring. The joining material essentially produces a turbine that is single solid unit formed from three separate components.

Turbines assemblies of the type described above can experience noise caused by the combination of mechanical and fluid dynamic properties of the turbine sub-assembly. Noise generated in a turbine subassembly can be significant enough to irritate drivers.

Thus, there is a long-felt need to provide a turbine that has either reduced stiffness, reduced resonance, and/or a change in natural frequency that will lead to a reduction in noise produced by the torque converter without reducing the performance and durability of the turbine.

SUMMARY OF THE INVENTION

The invention broadly comprises a torque converter including: a core ring; a turbine blade connected to the core ring and having a perimeter where the perimeter includes a segment facing an outer surface of the core ring and is disposed proximate the outer surface. A joining material is used to fixedly connect less a portion of the segment but less than the entirety of the segment to the outer surface of the core ring. The segment is fixedly connected to reduce resonance in the turbine.

In some aspects, the core ring includes an inner surface oppositely disposed with respect to the outer surface and at least one open path between the inner and outer surfaces. The at least one open path is aligned with the segment and the alignment is orthogonal to the outer surface of the core ring. The at least one open path is arranged to block capillary action along the segment. In some aspects, the core ring includes first and second slots, the blade includes first and second tabs inserted through the first and second slots, respectively, and at least one of the first or second slots includes the at least one open path. In some aspects, each of the first or second slots includes the at least one open path.

In some aspects, the core ring includes first and second slots, the blade includes first and second tabs inserted through the first and second slots, respectively, and the at least one open path is disposed between the first and second slots and separate from the first and second slots. In some aspects, the core ring includes first and second slots, the blade includes first and second tabs inserted through the first and second slots, respectively, and the segment includes a notch disposed between the first and second tabs. The notch is arranged to block capillary action along the segment. In some aspects, the joining material is a brazing material or a welding material.

The invention further broadly comprises a core ring for a torque converter including an outer surface and a discontinuity in said outer surface. The discontinuity is arranged to block capillary action for flowable joining material disposed in an interface between a turbine blade installed on the core ring and the outer surface. In some aspects, the core ring includes a slot and the discontinuity is in contact with the slot. In some aspects, the discontinuity is an opening in the core ring.

The invention further broadly comprises a blade for a turbine in a torque converter which includes first and second tabs disposed on an edge of the blade and arranged to affix the blade to a core ring for the torque converter. The edge is arranged to be proximate an outer surface of the core ring when the blade is affixed to the core ring. A notch in the edge is arranged to prevent capillary flow of joining material in a channel formed between the blade and the outer surface.

The invention further broadly comprises a torque converter which includes a core ring and a turbine blade connected to the core ring where the blade has an edge proximate an outer surface of the core ring. At least one channel is formed between the blade and the outer surface and joining material at least partially filling the channel and filling less than the entirety of the channel.

The invention also broadly comprises a method for controlling resonance of a turbine in a torque converter which includes the steps of: disposing a segment of a perimeter for the blade proximate an outer surface of a core ring for the torque converter; creating a channel between the segment and the outer surface; creating a discontinuity in the channel to block capillary action in the channel; and disposing a flowable connecting material in the channel. The method further fixedly connects less than the entirety of the segment to the outer surface. In some aspects, the method connects the turbine blade to the core ring.

It is a general object of the present invention to provide a torque converter with a turbine blade with reduced resonance and stiffness.

These and other objects and advantages of the present invention will be readily appreciable from the following description of preferred embodiments of the invention and from the accompanying drawings and claims.

BRIEF DESCRIPTION OF THE DRAWINGS

FIG. 14 is a perspective view of a turbine blade for use with a present invention core ring; and, FIG. 15 is a rear view of a present invention core ring.

DETAILED DESCRIPTION OF THE PREFERRED EMBODIMENT

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figures 7A, 7B:
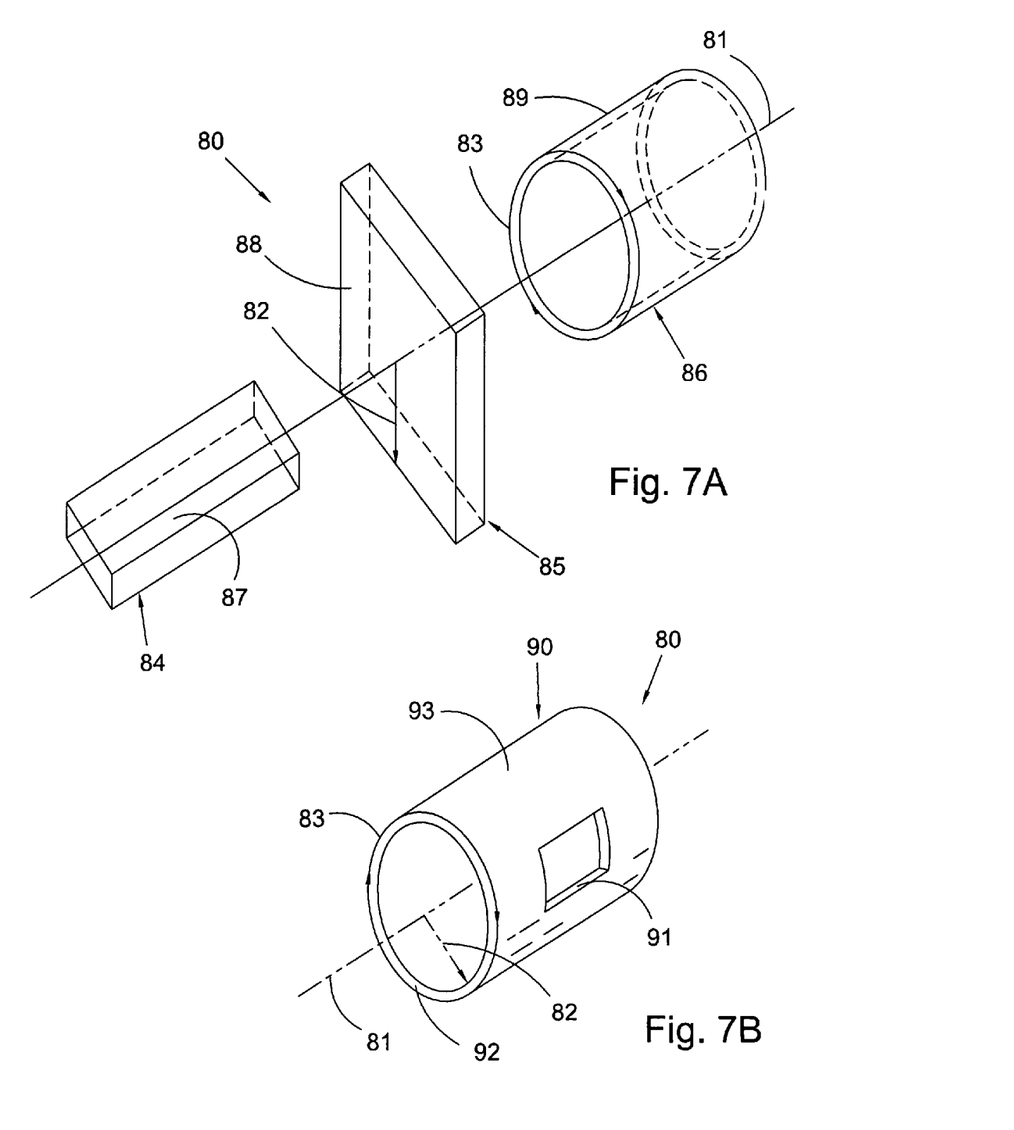
FIG. 7A is a perspective view of a cylindrical coordinate system demonstrating spatial terminology used in the present application.
FIG. 7B is a perspective view of an object in the cylindrical coordinate system of FIG. 7A demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 7B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
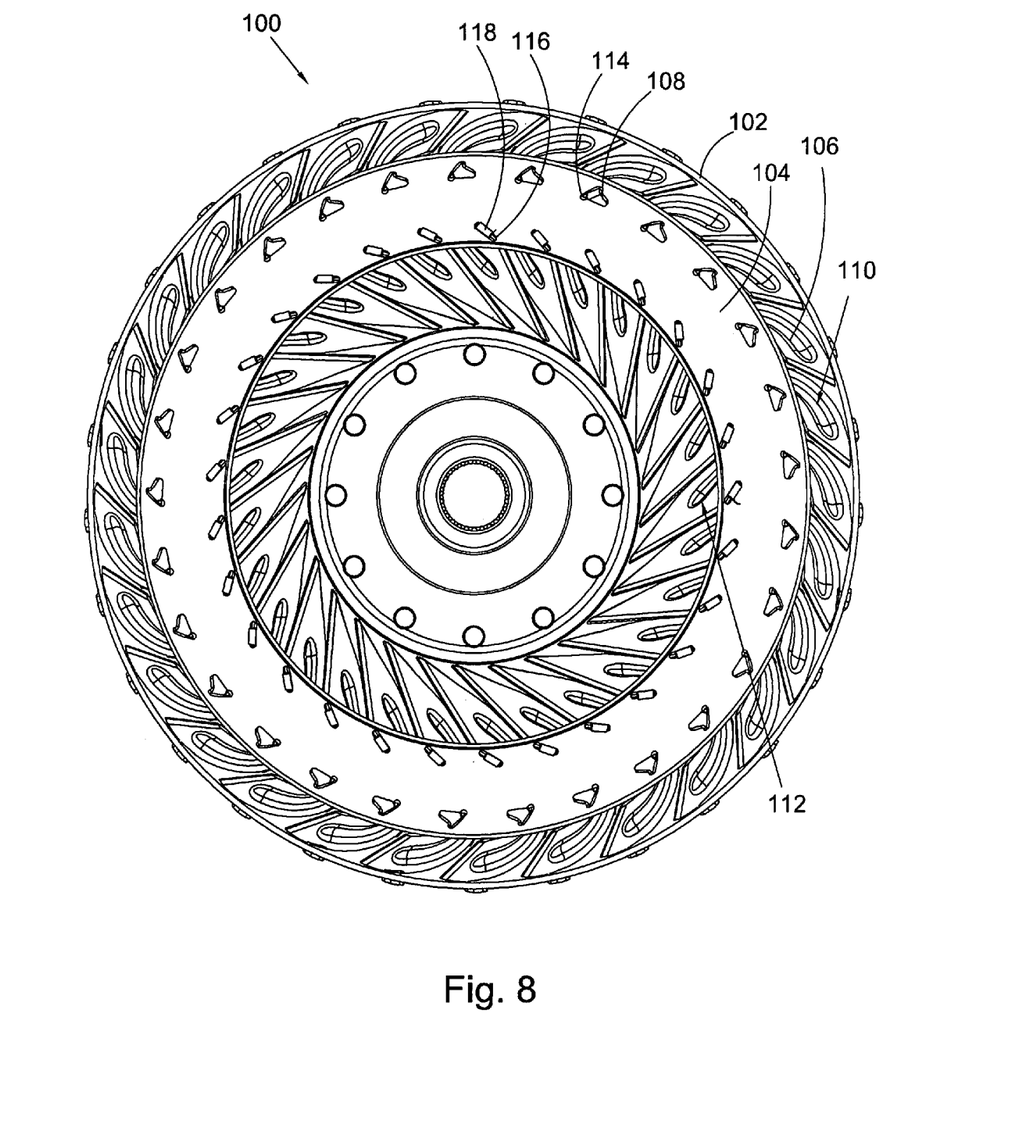
FIG. 8 is a rear view of a present invention torque converter turbine having a plurality of present invention blades.

FIG. 8 is a rear view of present invention torque converter turbine 100 having a plurality of present invention blades 106.

Figure 9:
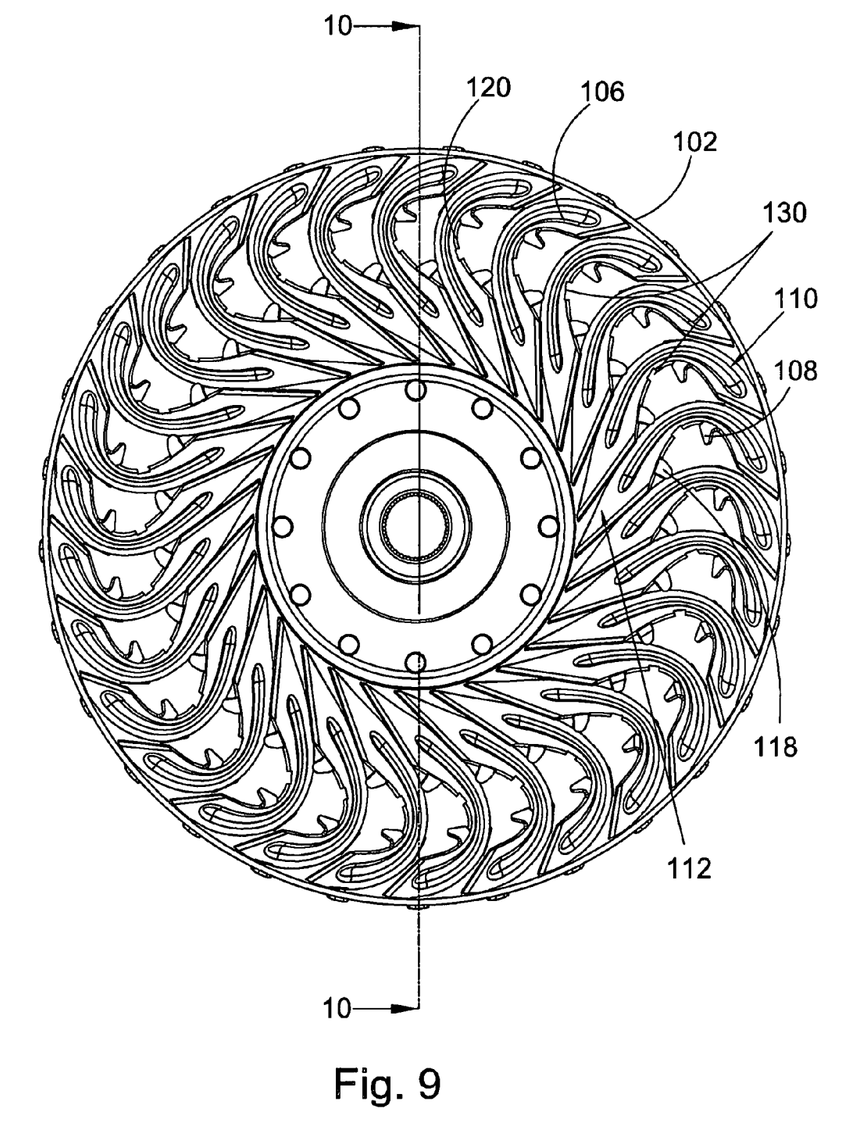
FIG. 9 is a rear view of the torque converter turbine shown in FIG. 8 with the core ring removed.

FIG. 9 is a rear view of torque converter turbine 100 shown in FIG. 8 with the core ring removed.

Figure 10:
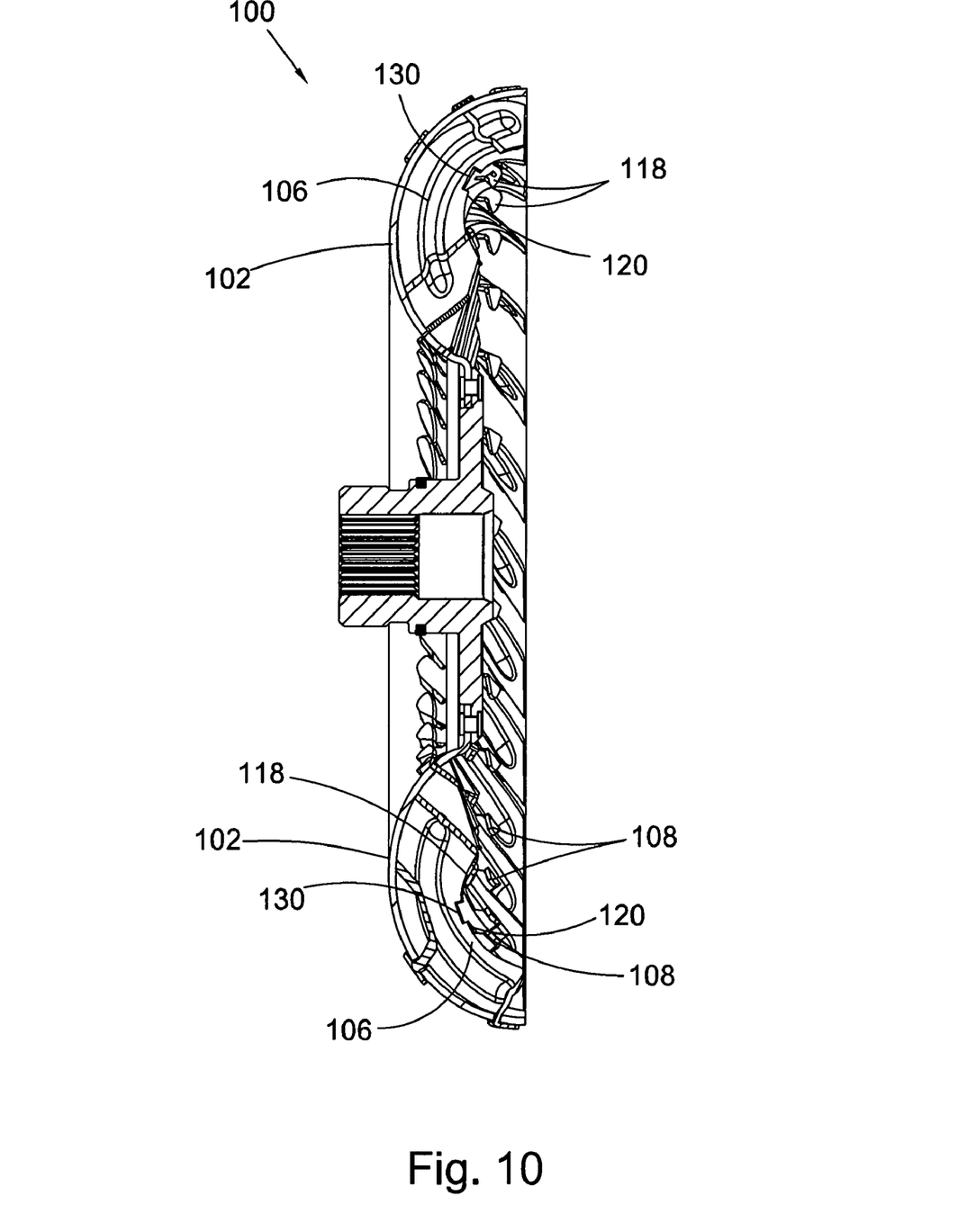
FIG. 10 is a cross-sectional view of the torque converter turbine shown in FIG. 9 along line 10-10 in FIG. 9.

FIG. 10 is a cross-sectional view of torque converter turbine 100 shown in FIG. 9, taken generally along line 10-10 in FIG. 9.

Figure 11:
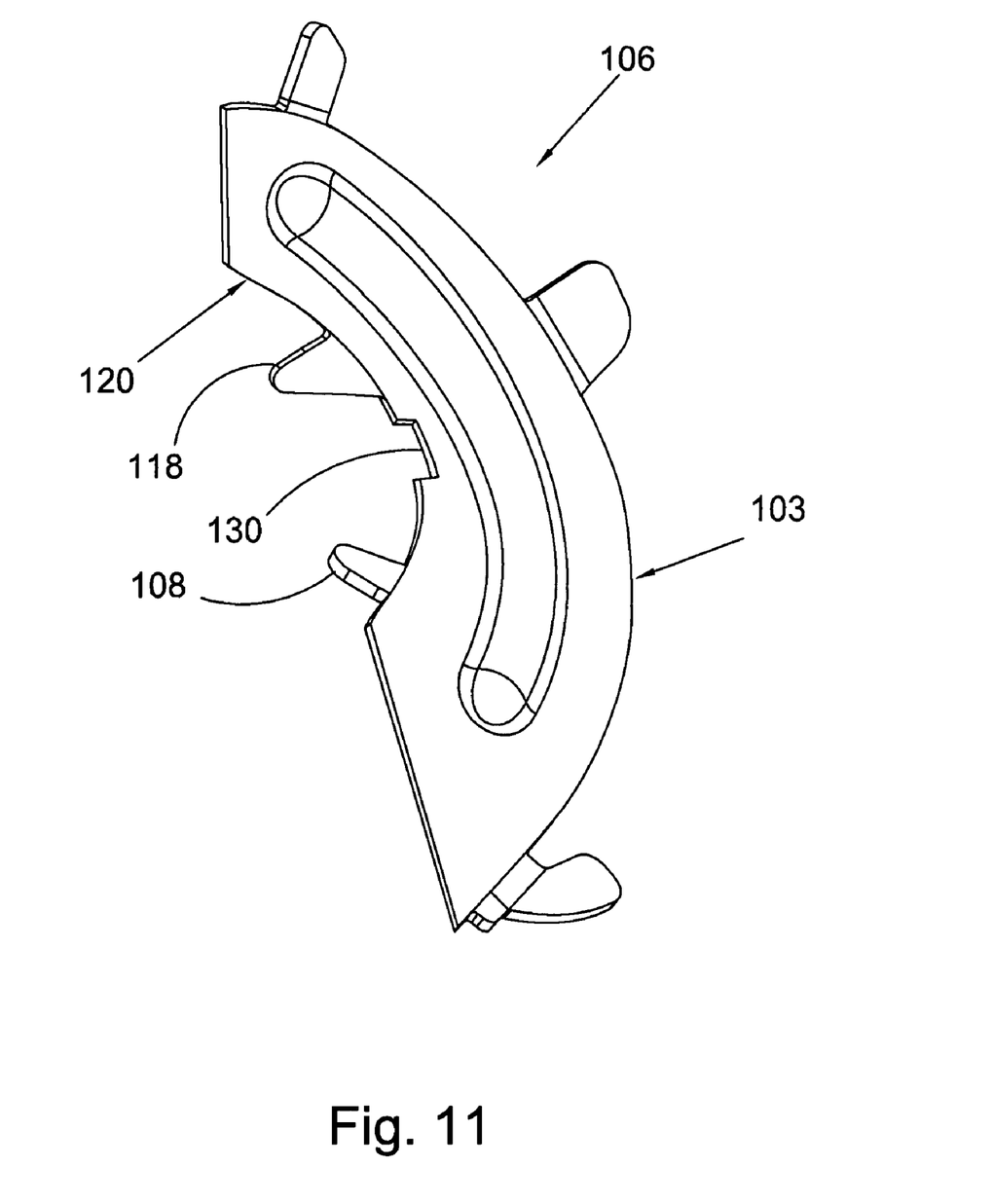
FIG. 11 is a perspective view of a present invention torque converter turbine blade.

FIG. 11 is a perspective view of torque converter turbine blade 106. The following should be viewed in light of FIGS. 8 through 11. Turbine 100 includes a plurality of blades 106. Blades 106 are typically attached to turbine shell 102 and core ring 104 to form turbine 100. Blades 106 are initially attached to the core ring using tabs, such as tabs 108 and 118. Segment, or edge, 120 is the portion of perimeter 103 of the blade that faces outer surface of core ring 104. That is, segment 120 is proximate the outer surface after the blade has been installed using the tabs. A gap, or channel, remains between the interface of edge 120 and outer surface of core ring 104. As noted supra, flowable joining material is used to fixedly secure turbine blades to a core ring and capillary action is used to disperse the joining material throughout the interface. That is, the flowable material is disposed in the channel. The joining material can be any material known in the art for joining metal surfaces which can include, but is not limited to, brazing material, welding material, or a similar metallic attachment substance. In some aspects, a brazing paste is used to attach blades 106 to core ring 104. Brazing paste flows along the interface of edge 120 surface and outer surface of core ring 104 when heat is applied, for example, in a brazing oven. The use of brazing paste enables the application of joining material in areas normally inaccessible once the blades are connected with tabs to the core ring.

Blades 106 include notches 130 disposed along perimeter 103 of the blades. Specifically, the notches are disposed along segment 120 of the perimeter. Notch 130 creates a discontinuity along the interface between segment 120 and the outer surface of the core ring. The discontinuity disrupts capillary action along the interface, interrupting the flow of the joining material. Alternately stated, the notch creates a section or segment 120 that is separated from the outer surface of core ring 104 a sufficient amount to prevent the flow of joining material along the channel formed between edge 120 and core ring 104. Thus, the joining material does not join blade 106 to the outer ring at notch 130. That is, the joining material fixedly connects less than the entirety of segment 120 and core ring 104.

It should be understood that notch 130 is not limited to the size, shape, orientation, or position on segment 120 shown in the figures and that other sizes, shapes, orientations, or positions of segment 120 are within the spirit and scope of the claimed invention. It also should be understood that more than one notch 130 can be disposed on segment 120. Further, it should be understood that a turbine can include blades 106 having different notches 130. That is, not every blade has the same type of notch 130 or number of notches 130.

Thus, turbine 100 includes one or more blades 106 unconnected to core ring 104 at points dispersed about the core ring. In some aspects, notch 130 will change the natural frequency of a turbine due to this variation in the application of the joining material. In some aspects, turbine 100 is more flexible, which will lead to reduced noise produced by the turbine.

Tabs 108 and 118, integral to blades 106, provide one means for attaching blades 106 to core ring 104. Tabs 108, which are disposed on edge 120 of blades 106, are positioned in turbine 100 proximate inlet side 110 and are inserted through slots 114, which are also proximate inlet side 110 of core ring 104. Tabs 108 are bent after insertion through slots 114, and serve to hold blades 106 to the front or outer surface of core ring 104. In some aspects, tabs 118 on blades 106 are positioned proximate outlet side 112 of turbine 100. Tabs 118 can further secure blades 106 to core ring 104 and are bent after insertion through slots 116. In some aspects, notch 130 in blade 106 is positioned between tabs 108 and 118.

FIG. 10 provides further detail regarding the configuration of turbine 100.

In FIG. 11, tabs 108 and 118 are shown unbent which is the position of the tabs prior to the assembly of turbine 100. After tabs 108 and 118 are inserted through slots 114 and 116, respectively, the tabs are bent to secure blades 106 to core ring 104.

Figures 12, 13:
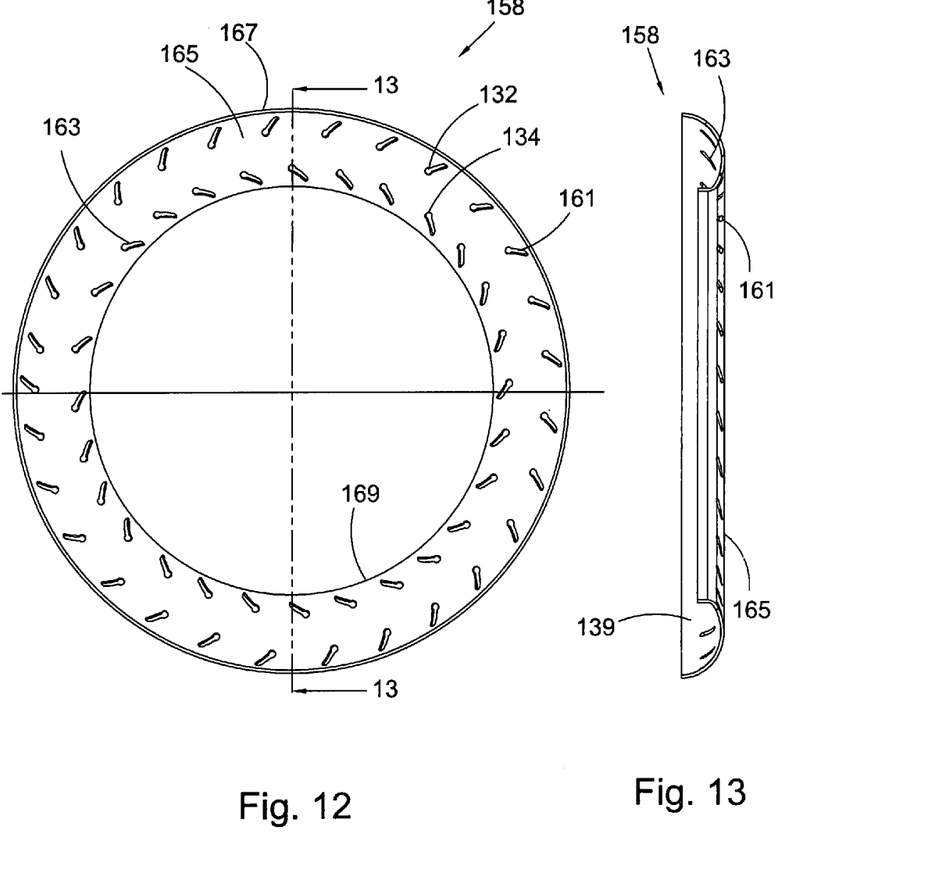
FIG. 12 is a front view of a present invention core ring.
FIG. 13 is a cross-sectional view of the core ring shown in FIG. 12, taken generally at line 13-13 in FIG. 12.

FIG. 12 is a front view of present invention core ring 158.

FIG. 13 is a cross section view of core ring 158, taken generally at line 13-13 in FIG. 12.

Figures 14, 15:
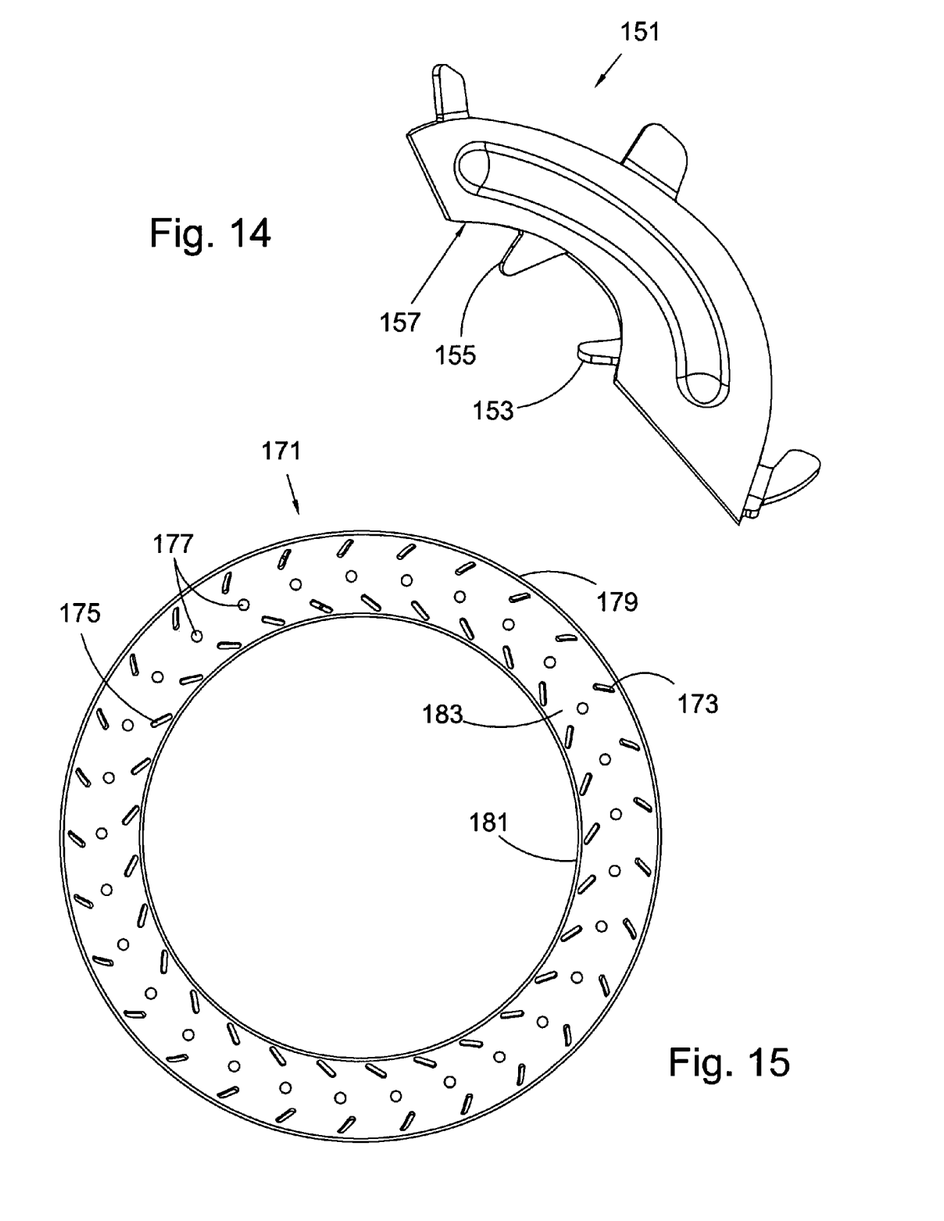

FIG. 14 is a perspective view of turbine blade 151 for use with a present invention core ring. The following should be viewed in light of FIGS. 12 through 14. Blade 151 is used as an example in the following discussion, however, it should be understood that other turbine blades, such as blades 106 shown in FIG. 11, are usable with a present invention core ring. Ring 158 includes slots 161 and 163 used to receive tabs 153 and 155, respectively. Slots 161 and 163 include widened portions 132 and 134, respectively. The widened portions provide an open path between outer surface 165 of core ring 158 and inner surface 139 of core ring 158 after tabs 153 and 155 have been inserted through slots 161 and 163, respectively and bent against surface 139. By open path, we mean that a void or opening exists that links surfaces 165 and 139 and includes a break or opening in surface 165. Once blade 151 is installed on the core ring, the edge facing surface 165, that is edge 157, is aligned with one or both of portions 132 and 134. The alignment is orthogonal to surface 165. That is, edge 157 passes over one or both of the portions.

Portions 132 and 134 form a discontinuity in the interface between edge 157 and surface 165. The discontinuity disrupts capillary action along the interface, interrupting the flow of the joining material. Alternately stated, the widened portions create respective sections of edge 157 that are separated from surface 165 a sufficient amount to prevent the flow of joining material along the channel formed between edge 157 and surface 165. Thus, the joining material does not join blade 151 to the outer ring at the widened portions. In some aspects, portions 132 are adjacent the end of slot 161 distal to outer circumference 167 of core ring 158. In some aspects, portions 134 are positioned adjacent the end of slot 163 distal to inner circumference 169 of core ring 158.

Although slots 161 and 163 in FIG. 12 are each shown with respective widened portions, it should be understood that other configurations and combinations of portions 132 and 134 are within the spirit and scope of the invention as claimed. For example, widened portions 132 or 134 can be positioned on core ring 158 in tandem as depicted in FIG. 12, or alternatively (not shown), core ring 158 can comprise only portions 132, only portions 134, a combination of portions 132 and 134, or combinations of slots with and without portions 132 or 134. It also should be understood that portions 132 and 134 are not limited to the size and shape shown in the figures. The underlying principle is that the portions are sufficiently sized and positioned, with respect to the particular turbine blades installed on the core ring, to form a discontinuity with respect to the capillary action for the particular joining material used.

The location at which the joining material is applied to the core ring also is a factor as to where edge 157 is bonded to surface 165. For example, in FIG. 12, braze paste applied proximate circumferences 167 and 169 flows along the channel formed between edge 157 and surface 165 toward slots 161 and 163, respectively, until the paste reaches portions 132 and 134, respectively. Upon reaching portions 132 or 134, braze paste flowing along the channel formed by edge 157 and surface 165 stops flowing due to the void on surface 165 resulting from the open paths associated with the widened portions. That is, one wall of the channel needed for capillary action to drive the flow of braze paste has been eliminated by the widened portions, and capillary action is interrupted. Thus, the joining material does not fixedly connect surface 165 to the portion of edge 157 that lies between portions 132 and 134. This lack of fixed connection between blade 151 and core ring 158 produces a turbine that is less stiff than a turbine that has the entire edge 157 fixedly connected to the core ring outer surface.

FIG. 15 is a front view of present invention core ring 171. The following should be viewed in light of FIGS. 14 and 15. Blade 151 is used as an example in the following discussion, however, it should be understood that other turbine blades are usable with a present invention core ring. Ring 171 includes slots 173 and 175 used to receive tabs 153 and 155, respectively. Openings 177 are located between outer circumference 179 of core ring 171 and inner circumference 181 of the core ring. Openings 177 provide an open path between outer surface 183 of the core ring and the inner surface (not shown) of the core ring after blades 151 have been installed on ring 171 (tabs 153 and 155 have been inserted through slots 173 and 175, respectively and bent against the inside surface). Once blade 151 is installed on the core ring, the edge facing surface 183, that is edge 157, is aligned with opening 177. The alignment is orthogonal to surface 183. That is, edge 157 passes over the opening.

Opening 177 forms a discontinuity in the interface between edge 157 and surface 183. The discontinuity disrupts capillary action along the interface, interrupting the flow of the joining material. Alternately stated, the openings create respective sections of edge 157 that are separated from surface 183 a sufficient amount to prevent the flow of joining material along the channel formed between edge 157 and surface 183. Thus, the joining material does not join blade 151 to the outer ring at the openings. As long as openings 177 are aligned with blade 151 to form capillary action discontinuities, the openings are not limited to any position on core ring 171. For example, the openings can be midway between the slots or closer to one or the other of the slots. A same core ring 171 can have openings in different positions with respect to the relative slots. It also is possible (not shown) for ring 183 to have respective slots 173 and 175 without an intervening opening 177.

Alternative means of obstructing the flow of joining material such as applying detents, ridges, pockets or another obstruction can be used between the surface of the core ring and the turbine blade mounting surface.

The following should be viewed in light of FIGS. 8 through 15. A turbine is not limited to using any particular combination of present invention core rings and blades. For example, a turbine can use core ring 158 or 171 with blades 106.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A torque converter, comprising:
    a core ring with inner and outer surfaces and first and second slots connecting the inner and outer surfaces; and,
    a turbine blade including first and second tabs extending from a perimeter of the turbine blade and through the first and second slots, the perimeter of the turbine blade including a segment between the first and second tabs, wherein;
        the turbine blade includes a notch in the segment of the perimeter;
        the turbine blade includes first and second portions of the segment of the perimeter located between the first tab and the notch and between the notch and the second tab, respectively; and,
        first joining material fixedly connects the first and second portions of the segment to the outer surface of the core ring, and the joining material is absent between the notch and the outer surface of the core ring; or,
    wherein:
        the core ring includes at least one open path connecting the inner and outer surfaces and aligned with a third portion of the segment of the perimeter of the turbine blade;
        the segment of the turbine blade includes a fourth portion between the first tab and the third portion and a fifth portion between the third portion and the second tab; and,
    second joining material fixedly connects the fourth and fifth portions of the segment of the perimeter to the outer surface of the core ring, and the joining material is absent between the segment of the perimeter and the outer surface of the core ring.

2. The torque converter of claim 1, wherein said first and second segments or said fourth and fifth segments are fixedly connected to reduce resonance in said turbine.

3. The torque converter of claim 1, wherein:
    the at least one open path is formed by respective portions of the first or second slots; or,
    the at least one open path is separated from the first and second slots.

4. The torque converter of claim 1, wherein said at least one open path is arranged to block capillary action along said segment.

5. The torque converter of claim 1, wherein said notch is arranged to block capillary action along said segment.

6. The turbine of claim 1, wherein said first and second joining materials are a brazing material.

7. The turbine of claim 1, wherein said first and second joining materials are a welding material.

8. A method for controlling resonance of a turbine in a torque converter, comprising:
    disposing a segment of a perimeter for said blade proximate an outer surface of a core ring for said torque converter;
    creating a channel between said segment and said outer surface;
    creating a discontinuity in said channel to block capillary action in said channel; and,
    disposing a flowable connecting material in said channel.

9. The method of claim 8, further comprising fixedly connecting less than the entirety of said segment to said outer surface.

10. The method of claim 8, further comprising connecting said turbine blade to said core ring.

11. The method of claim 8, wherein said core ring further comprises an inner surface oppositely disposed with respect to said outer surface and wherein creating a discontinuity further comprises disposing at least one clear path between said inner and outer surfaces and aligning said at least one clear path with said segment, said alignment with respect to a line orthogonal to said outer surface of said core ring.

12. The method of claim 11, wherein said core ring further comprises first and second slots and said blade further comprises first and second tabs inserted through said first and second slots, respectively, and wherein disposing at least one clear path between said inner and outer surfaces further comprises forming said at least one clear path as part of at least one of said first and second slots.

13. The method of claim 12, wherein disposing at least one clear path between said inner and outer surfaces further comprises forming said at least one clear path as part of each of said first and second slots.

14. The method of claim 11, wherein said core ring further comprises third and fourth slots and said blade further comprises third and fourth tabs inserted through said third and fourth slots, respectively, and wherein disposing at least one clear path between said inner and outer surfaces further comprises disposing said at least one at least one clear path between said third and fourth slots and separate from said third and fourth slots.

15. The method of claim 8, wherein said core ring further comprises fifth and sixth slots and said blade further comprises fifth and sixth tabs inserted through said fifth and sixth slots, respectively, and wherein creating a discontinuity further comprises notching said segment between said fifth and sixth tabs.

16. The method of claim 8, wherein said joining material is a brazing material.

17. The method of claim 8, wherein said joining material is a welding material.

* * * * *